United States Patent [19]

Nopanen

[11] Patent Number: 5,094,154
[45] Date of Patent: Mar. 10, 1992

[54] ELECTRIC TOASTER WITH TIME DELAY MECHANISM

[75] Inventor: Esko J. Nopanen, Shelton, Conn.

[73] Assignee: Black & Decker Inc., Newark, Del.

[21] Appl. No.: 572,657

[22] Filed: Aug. 27, 1990

[51] Int. Cl.$^5$ .......................... A47J 37/08; H05B 1/02
[52] U.S. Cl. .................................... 99/328; 99/329 R;
    99/329 RT; 99/385; 99/389; 219/492; 219/501;
    219/514; 219/519
[58] Field of Search ............. 99/329 RT, 328, 329 R,
    99/327, 334, 335, 385, 389; 219/492, 493, 510,
    512, 514, 491, 501, 494, 519

[56] References Cited

U.S. PATENT DOCUMENTS

| | | | |
|---|---|---|---|
| 2,114,000 | 4/1938 | Vidaver | 219/519 X |
| 2,451,508 | 10/1948 | Olving | 219/519 X |
| 2,693,141 | 11/1954 | Johnson et al. | 99/329 R |
| 2,799,217 | 7/1957 | Ireland | 99/329 R |
| 2,857,838 | 10/1958 | Palmer | 99/329 R |
| 3,289,570 | 12/1966 | Smith | 99/327 |
| 3,291,968 | 12/1966 | Snyder | 99/328 X |
| 3,752,955 | 8/1973 | Grove | 99/389 X |
| 3,869,970 | 3/1975 | Eagle | 99/329 R |
| 3,875,854 | 4/1975 | Wassenaar | 219/491 X |
| 4,065,658 | 12/1977 | Keim | 99/389 X |
| 4,170,932 | 10/1979 | Lalancette | 99/329 RT |
| 4,189,632 | 2/1980 | Swanson et al. | 99/385 X |
| 4,201,124 | 5/1980 | Huggler | 99/385 X |
| 4,395,621 | 7/1983 | Parker | 219/492 |
| 4,454,803 | 6/1984 | Wolf et al. | 99/329 RT |
| 4,487,115 | 12/1984 | Su | 99/327 |
| 4,503,758 | 3/1985 | Carville | 99/329 RT |
| 4,510,376 | 4/1985 | Schneider | 219/492 |
| 4,518,849 | 5/1985 | Rolland | 219/492 |
| 4,671,668 | 6/1987 | Narita et al. | 99/327 X |
| 4,755,656 | 7/1988 | Charlesworth et al. | 219/492 |
| 4,976,194 | 12/1990 | Kelterborn et al. | 99/329 RT X |
| 5,018,437 | 5/1991 | San Juan | 99/329 RT X |
| 5,044,263 | 9/1991 | Bikert et al. | 99/329 RT X |

*Primary Examiner*—Philip R. Coe
*Assistant Examiner*—C. Cooley
*Attorney, Agent, or Firm*—Barry E. Deutsch

[57] ABSTRACT

An electric toaster includes a housing having at least one heating element mounted therein. A source of electric power is selectively connected to the heating element for energization thereof. A carriage is mounted in the housing for supporting a food product to be toasted and is movable between upper non-toasting and lower toasting positions. An electrically operated latch mechanism holds the carriage in its toasting position. A temperature sensing switch is electrically connected to the latch mechanism for releasing the mechanism and returning the carriage to its non-toasting position when the temperature of the food has reached a predetermined level. A time delay mechanism is electrically connected to the temperature sensing switch for disabling the switch during an initial period of time at the start of each toasting cycle when the carriage is moved to its toasting position.

6 Claims, 2 Drawing Sheets

ELECTRIC TOASTER WITH TIME DELAY MECHANISM

BACKGROUND OF THE INVENTION

This invention relates to an electric toaster and more particularly to a control circuit for an electric toaster which allows immediate reset of the toaster into a new toasting cycle.

The common electric toaster found in most homes employs a bimetallic sensor that deflects from heat and activates a circuit that causes the toast carriage to move in the toaster housing from a lower toasting position to an upper non-toasting position. When the toast carriage moves to its non-toasting position the heating elements of the toaster are deenergized. A color control adjustment lever or knob is typically provided to enable the user of the toaster to select the desired degree of toasting. When it is desired to have a darker colored toast, the bimetallic sensor must deflect to a greater degree to activate the latch mechanism to allow the carriage to move from its toasting position to its non-toasting position. Conversely, an adjustment to a lighter toast color results in the bimetallic member deflecting a smaller distance.

Once a first toasting cycle has been completed, it has heretofore been very difficult to immediately start a next toasting cycle. The problem has been caused as a result of the bimetallic sensor not having cooled to a sufficient lower temperature level to permit the toaster carriage to be latched into its toasting position. Typically, a pop-up solenoid is used as the latching mechanism to retain the carriage in its toasting position. If the sensor has not cooled sufficiently to enable the solenoid to be retained in its latched position, the carriage will be immediately returned to its non-toasting position and the solenoid will produce an annoying buzz sound as the user attempts to hold the cycle button or lever down, while the pop-up solenoid is releasing the carriage to move the carriage to its non-toasting position.

Some toasters have utilized additional ventilation holes to allow cool air to flow past the sensor element to try to lower the temperature of the sensor element relatively quickly. However, the attempted resolution has not been entirely satisfactory and it has been found that particularly when the prior toasting cycle produced a relatively dark piece of toast, the next toasting cycle could not be started as quickly as desired.

Accordingly, it is an object of this invention to provide an electric toaster wherein the toaster can be immediately reset into a successive toasting cycle.

SUMMARY OF THE INVENTION

The foregoing object and other objects of this invention are attained in an electric toaster comprising a housing; at least one heating element mounted in the housing; a source of electric power selectively connected to said heating element for energizing said element; a carriage mounted in said housing for supporting the food product to be toasted and movable between an upper non-toasting position and a lower toasting position; an electrically operated latch mechanism for holding said carriage in its toasting position; a temperature sensing switch electrically connected to said latch mechanism for releasing said mechanism and returning said carriage to its non-toasting position when the temperature of the food product has attained a predetermined level; and a time delay mechanism electrically connected to said temperature sensing switch for disabling said switch during an initial predetermined period of time at the start o each toasting cycle when the carriage is moved to its toasting position.

DESCRIPTION OF THE PREFERRED EMBODIMENT

Figure 1:
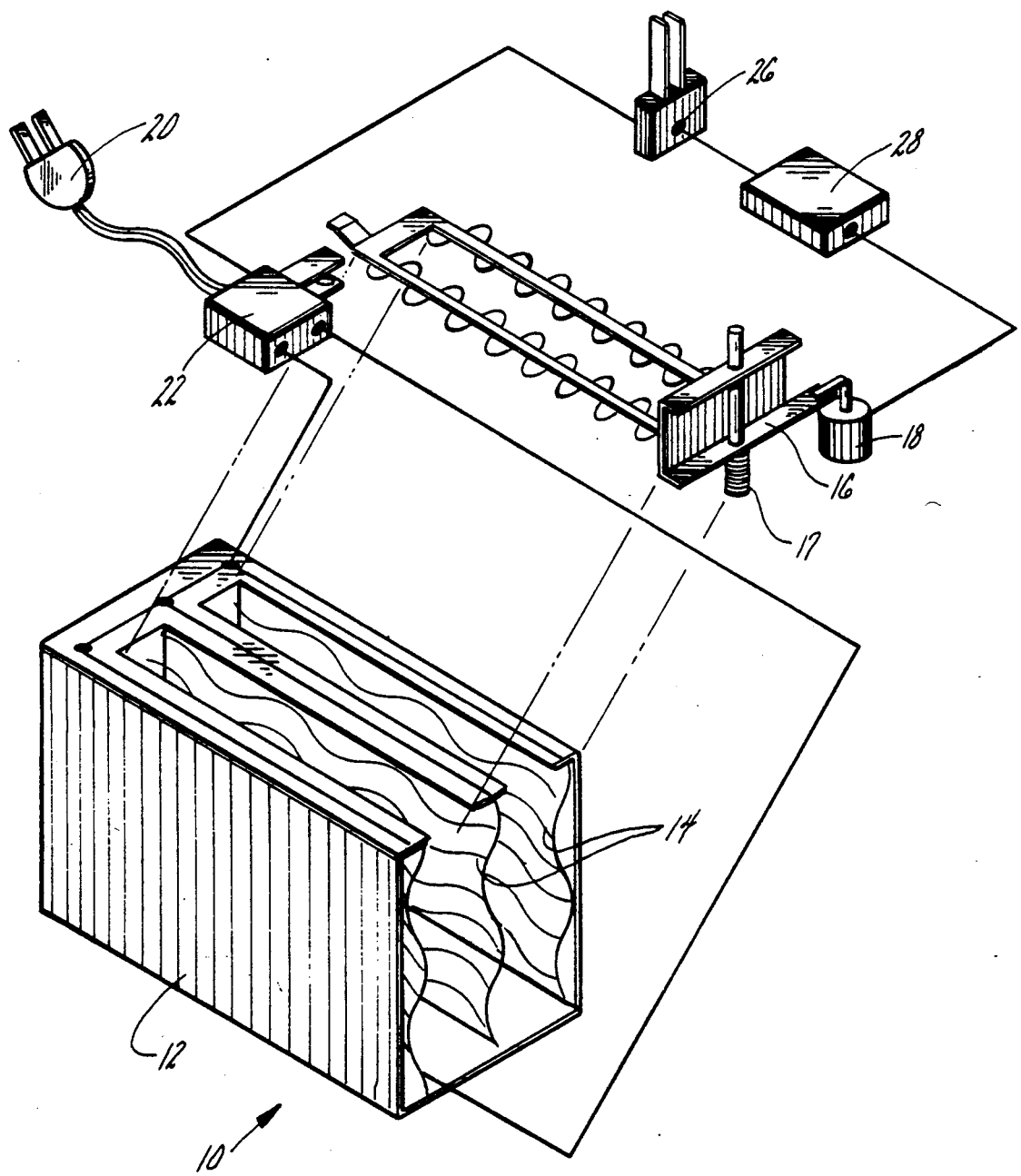
FIG. 1 is an exploded, somewhat diagrammatic view of an electric toaster including the present invention.

Referring now to the drawing, there is disclosed a preferred embodiment of the present invention. In referring to the figures of the drawing, like numeral shall refer to like parts.

Referring specifically to FIG. 1, there is disclosed a conventional toaster 10 having a housing or chassis 12. A plurality of electric heating elements 14 are mounted within the housing for generating heat to toast the food item moved into a toasting position. Toaster 10 further includes a carriage 16 movable within housing 12 between an upper non-toasting position and a lower toasting position. Spring 17 normally urges carriage 16 into its upper non-toasting position. An electrically operated latch mechanism 18 holds the carriage in its toasting position. As illustrated, mechanism 18 is a pop-up solenoid which when de-energized holds the carriage in its toast position and when electrically energized releases the carriage so that the carriage returns to its non-toasting position.

Toaster 10 further includes a source of electric power represented by electric plug 20. Plug 20 is connected to toaster start lever or switch 22 which when activated, connects the heating elements to the source of electric power. Further, start switch 22 is electrically connected in series with a bimetallic switch 26, a time delay mechanism 28, and solenoid 18.

Bimetallic switch 26 is used to sense the temperature of the toasted food and operates to activate a circuit that results in carriage 16 returning to its non-toasting position when the temperature of the food has attained a predetermined level. The operating point of switch 26 may be varied so that different colors of toast can be obtained. Typically, a color control adjustment lever or knob (not shown) is provided for selecting the desired degree of toasting. An adjustment to darker toast color causes the sensor of switch 26 to deflect further before the switch is closed to return carriage 16 to its non-toasting position.

Latch mechanism 18 is illustrated as a pop-up solenoid. When solenoid 18 is deactivated, it holds carriage 16 in its toasting position; the foregoing is illustrated in FIG. 1. When solenoid 18 is energized as a result of bimetallic switch 26 closing, latch mechanism 18 releases carriage 16 and spring 17 causes the carriage to move to its non-toasting position.

In conventional toasters of the prior art, when a toasting cycle has been completed and the user attempts to immediately restart a new toasting cycle very often bimetallic switch 26 has not opened since the sensor thereof has not cooled down to a sufficient temperature level to allow the switch to be automatically opened. Heretofore, with switch 26 closed, the electrically operated latch mechanism has also remained energized thereby preventing the carriage from being held in its toasting position. An annoying buzz sound results as a user attempts to hold start switch 22 down while latch mechanism 18 is releasing the carriage to enable the carriage to move upwardly under the influence of spring 17.

To eliminate the foregoing problem, the present invention utilizes a time delay mechanism 28 electrically connected to bimetallic switch 26 and latch mechanism 18. The function and operation of time delay mechanism 28 shall be described more fully in detail hereinafter.

Figure 2:
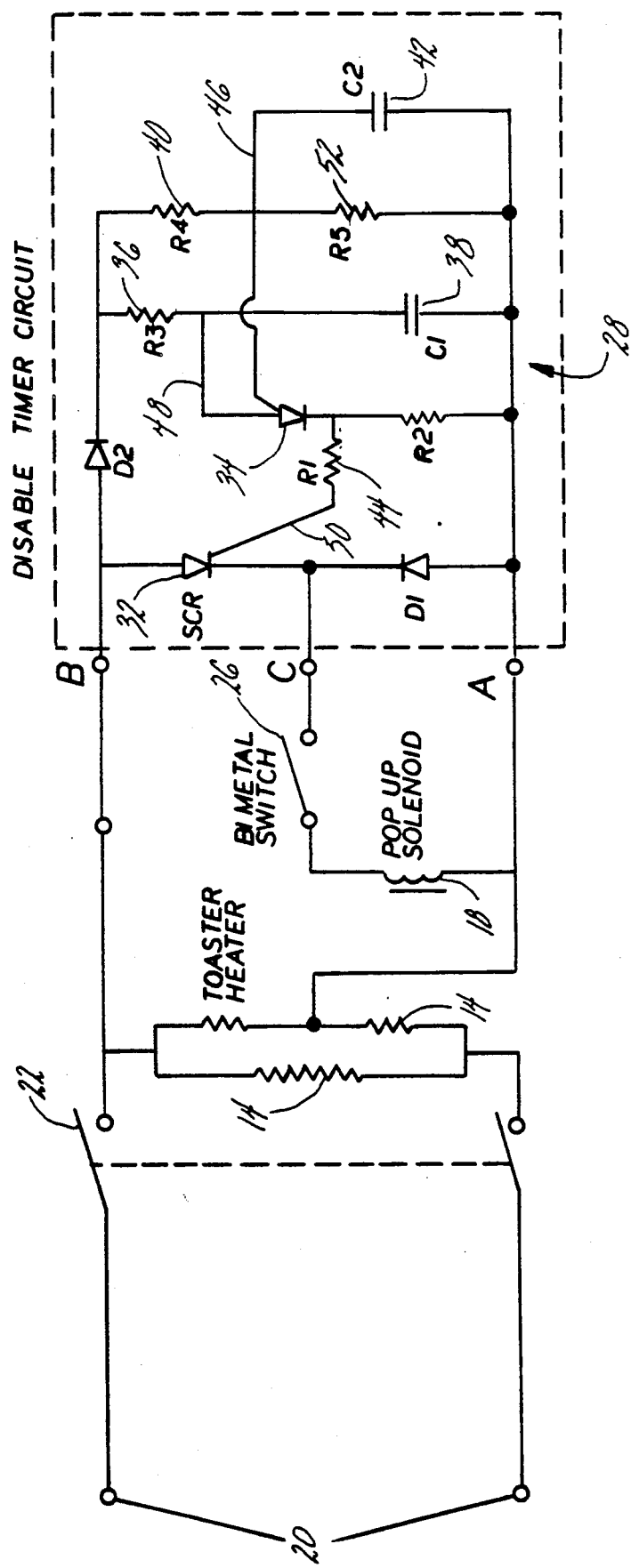
FIG. 2 schematically illustrates a wiring diagram of a preferred embodiment of the control of the present invention.

Referring now to FIG. 2, there is schematically illustrated a wiring diagram for the control of the toaster illustrated in FIG. 1. The electrical source of power 20 is connected via start lever or switch 22 to toaster heater elements 14. Switch 22 is also electrically connected in series with normally opened bimetallic switch 26 and pop-up solenoid or latch mechanism 18. Silicon control rectifier (SCR) 32 is also connected in series with switch 26 and solenoid 18. SCR 32 is normally in a non-conducting state and will only be placed in a conducting state when a pulse is delivered to its gate via conductor 50.

A programmable unijunction transistor (PUT) 34 is electrically connected in series with the gate of SCR 32. Capacitor 38 and resistor 36 form an RC timing circuit which controls the activation of PUT 34. Resistance elements 40 and 52 and capacitor 42 provide a reference level to control conduction of PUT 34. When capacitor 38 has been charged to a sufficient level, the voltage in conductor 48 exceeds the voltage in conductor 46 and the PUT 34 is placed into a conducting state, triggering the flow of current through SCR 32. Elements 32, 34, 36, 38, 40, and 42 and 52 combine to provide time delay mechanism 28.

In operation, let us assume toaster 10 is initially activated to toast one or two pieces of food, for example bread. The bread is placed on carriage 16 and switch 22 is actuated to move carriage 16 from its non-toasting upward position to its toasting downward position with respect to housing 12.

Closure of switch 22 results in heater elements 14 being energized. Since, we have assumed that no previous toasting cycle has taken place, bimetal switch 26 is in its normally open position and solenoid 18 is in its deenergized position to latch carriage 16 in its toasting position.

When bimetal switch 26 senses that the food has attained a predetermined degree of toasting, the switch closes which results in solenoid 18 being energized to release carriage 16. The carriage is moved upwardly by spring 17 to its non-toasting position.

If the user of toaster 10 immediately desires to toast additional bread, it has heretofore been required for the user to wait until bimetallic switch 26 cools sufficiently to return to its normally open position. However, through the use of the present invention, i.e. the placement of time delay mechanism 28 in series with the switch, the toaster is immediately ready for a successive toasting cycle.

Let us assume that bimetal switch 26 is still in its closed state when the user immediately desires to commence a second toasting cycle. The user places the bread onto the toasting carriage which is in its upward non-toasting position. The user moves start lever 22 downwardly to move carriage 16 into its toasting position. In the absence of time delay mechanism 28, the closed bimetal switch 26 would energize solenoid 1 to prevent the carriage from being latched into its toasting position.

Time delay mechanism is electrically connected in series with bimetal switch 26. Specifically, as illustrated in FIG. 2 SCR 32 is normally in a non-conducting state; therefore current is prevented from flowing from SCR 32 to bimetal switch 26 and solenoid 18. SCR 32 remains in a non-conducting state until PUT 34 is placed into a conducting state, which in turn sends a pulse through conductor 50 to place SCR 32 into a conducting state. PUT 34 remains non-conducting for a predetermined time interval, e.g. 10 seconds. The predetermined time delay of 10 seconds will enable bimetal switch 26 to open as a result of its cooling to a temperature level at which it will return to its normally open state. Switch 26 readily cools to its lower temperature level as a result of its contact with the cool bread slice and from moisture released from the bread being toasted. The predetermined time delay permits switch 26 to reset and allows the toasting cycle to proceed to completion.

While a preferred embodiment of the present invention has been described and illustrated, the invention should not be limited thereto, but may otherwise be embodied within the scope of the following claims.

What is claimed is:

1. An electric toaster comprising:
   a housing;
   at least one heating element mounted in said housing;
   a source of electric power selectively connected to said heating element for energizing said elements;
   a carriage mounted in said housing for supporting a food product to be toasted and movable between an upper non-toasting position and a lower toasting position;
   an electrically operated latch mechanism for holding said carriage in its toasting position;
   a normally open temperature sensing switch electrically connected to said latch mechanism for releasing said mechanism and returning said carriage to its non-toasting position upon closure of said switch when the temperature of the food product has attained a predetermined level; and
   a time delay mechanism electrically connected to said temperature sensing switch for preventing current flow to said switch during an initial predetermined period of time at the start of each toasting cycle when the carriage is moved to its toasting position.

2. An electric toaster in accordance with claim 1 wherein the predetermined period of time is 10 seconds.

3. An electric toaster in accordance with claim 2 wherein the latch mechanism is a pop-up solenoid.

4. An electric toaster in accordance with claim 3 wherein the temperature sensing switch and the time delay mechanism are electrically connected in series with said pop-up solenoid.

5. An electric toaster in accordance with claim 1 wherein the temperature sensing switch and the time delay mechanism are electrically connected in series with said latch mechanism.

6. An electric toaster in accordance with claim 1 wherein said time delay mechanism includes a normally non-conducting silicon controlled rectifier connected in series with said temperature sensing switch, said silicon controlled rectifier having a gate; a programmable unijunction transistor electrically connected in series with said gate of said silicon controlled rectifier for transmitting an electrical pulse to said gate to place said silicon controlled rectifier in a conducting state, said programmable unijunction transistor normally being in a nonconducting state and being placed in a conducting state after the lapse of said initial predetermined period of time to transmit said electrical pulse to said gate of said silicon controlled rectifier.

* * * * *